Patented Aug. 1, 1939

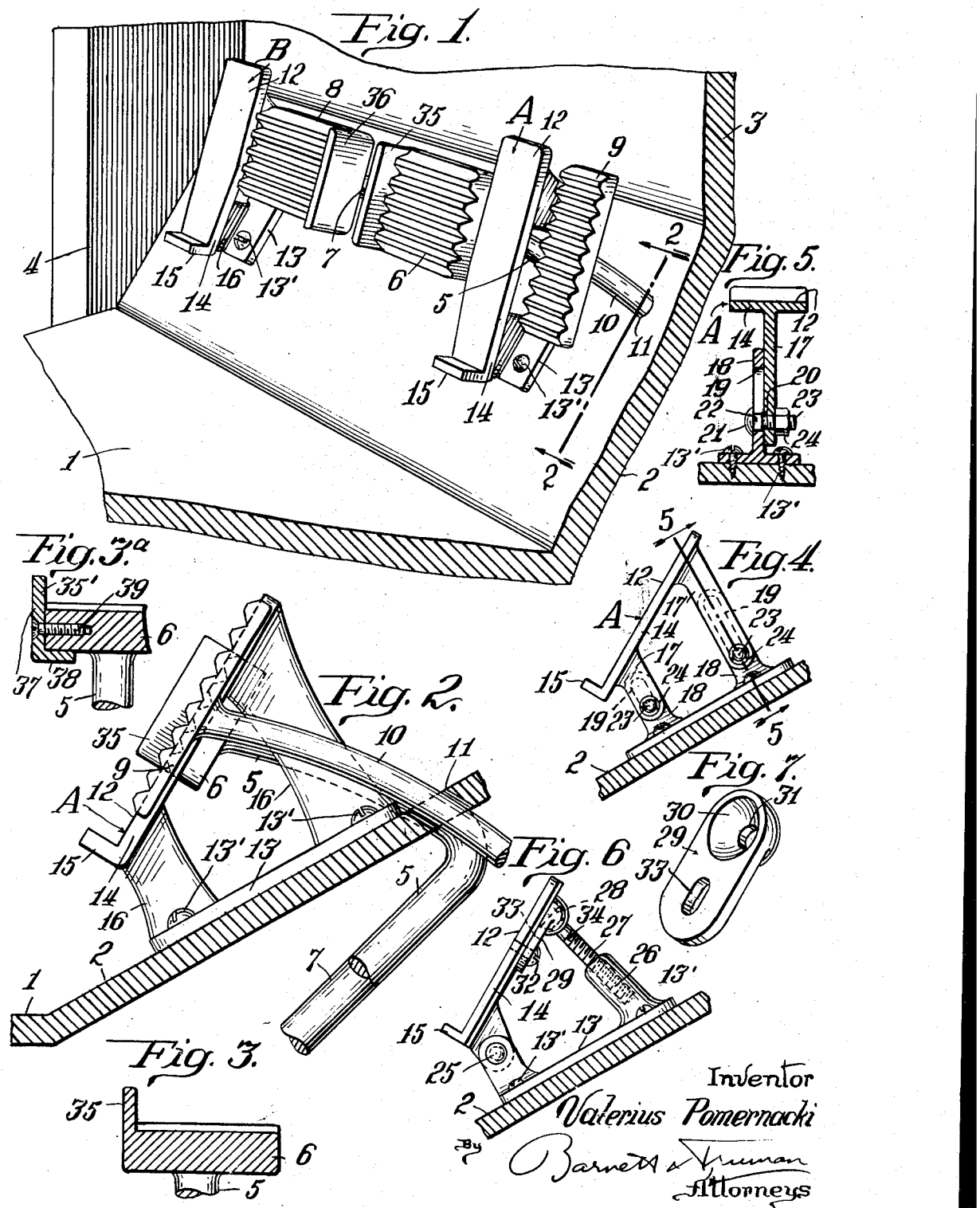
Aug. 1, 1939. V. POMERNACKI 2,167,959
AUTOMOBILE DRIVER'S INSTANT FOOT CONTROL
Filed Aug. 29, 1938

2,167,959

UNITED STATES PATENT OFFICE 2,167,959

AUTOMOBILE DRIVER'S INSTANT FOOT CONTROL

Valerius Pomernacki, Chicago, Ill.

Application August 29, 1938, Serial No. 227,303

14 Claims. (Cl. 74—564)

This invention relates to certain new and useful improvements in an automobile driver's instant foot control, and more particularly to improved means for supporting the feet of the driver adjacent to and in substantially the same plane as the upper surfaces of the foot-actuated control pedals of the automobile and in proper position to be instantly shifted onto these pedals.

As is well known, the foot-operated clutch and brake levers of the ordinary automobile project upwardly through openings in the foot-board so that the pedals carried at the upper ends of these levers are positioned side by side and usually at a considerable height above the floor-board when in their uppermost positions. The accelerator pedal, or foot-operated fuel-supply pedal is usually positioned at the right of the brake pedal but at a much lower level so as to be rather closely adjacent to the foot-board. In the process of driving the right foot must be intermittently shifted between the brake pedal and the accelerator, and when this foot is lifted from the accelerator to the brake there is a possibility of catching the foot beneath the brake pedal. This is especially true when the foot must be shifted quickly in a sudden emergency. It is also undesirable for the driver to "ride" the clutch, that is keep his left foot constantly on the foot-pedal, and the better drivers will ordinarily rest the left foot on the foot-board adjacent the clutch pedal, or on the floor board at some location to the rear of the pedal, at such times as it is unnecessary to release the clutch. When it becomes necessary to suddenly replace the left foot on the clutch pedal there is danger of catching this foot beneath the pedal. There is also the possibility of shifting the left foot laterally onto the brake pedal, or conversely shifting the right foot laterally onto the clutch pedal. These mistakes in properly positioning the feet on the pedals are frequently the cause of accidents, especially when the car must be stopped suddenly in an emergency, and the present invention is designed to minimize this danger as well as to provide means for simplifying the ordinary process of driving.

Briefly described, the present invention comprises the use of foot-rests on which the feet can conveniently and comfortably remain for the greater portion of the time, these foot-rests being positioned adjacent the pedals and in substantially the same plane therewith so that the feet can instantly and surely be shifted laterally from the rests to the pedals or vice versa. The invention also contemplates the use of stop-flanges at the adjacent sides of the clutch and brake pedals to prevent either foot from being shifted too far from its foot-rest.

The principal object of this invention is to provide improved safety driving means of the type briefly described hereinabove and disclosed more in detail in the specifications which follow.

Another object is to provide an improved foot-support or foot-rest adapted to be positioned adjacent a foot-pedal and adjusted into proper alignment therewith.

Another object is to provide improved stop flanges on the foot pedals.

Another object is to provide an improved positioning of the accelerator pedal.

Other objects and advantages of this invention will be more apparent from the following detailed description of certain approved forms of apparatus designed and operating according to the principles of this invention.

In the accompanying drawing:

Fig. 1 is a perspective view of a portion of the driver's compartment of an automobile showing the improved arrangement of the foot-operated control pedals, together with the improved safety foot-rests associated therewith.

Fig. 2 is a partial vertical section, on a larger scale, taken substantially on the line 2—2 of Fig. 1.

Fig. 3 is a vertical section through one of the pedals.

Fig. 3ª is a partial vertical section through one of the pedals, showing a modification.

Fig. 4 is a side elevation of one form of adjustable foot-rest.

Fig. 5 is a vertical section taken substantially on the line 5—5 of Fig. 4.

Fig. 6 is a side elevation of another form of adjustable foot-rest.

Fig. 7 is an enlarged perspective of the clamping member used in the Fig. 6 form of foot-rest.

In Fig. 1 is indicated a portion of the car structure comprising the floor board 1, foot-board 2, dash 3, and a portion of the left-hand side wall as indicated at 4. The foot-operated controls are, as usual, positioned above and operate through the upwardly and forwardly inclined foot-board 2. The brake lever 5 which carries the brake pedal 6 at its upper end extends downwardly and forwardly through an opening in the foot-board 2 and then turns rearwardly and is pivoted about a center such that the pedal 6 will, when depressed, move downwardly and forwardly toward the foot-board. The clutch lever 7 carrying the clutch pedal 8 is in all respects similar to the brake lever and pedal hereinabove described, and swings about the same axis. The brake and clutch pedals 6 and 8 are positioned side by side and at substantially the same inclination, but are spaced a short distance apart. The accelerator or gas-pedal 9 is supported at the upper end of rod or lever 10 which extends through an opening 11 in foot-board 2, and is as usual positioned at the right of brake-pedal 6. However, this accelerator pedal 9 is spaced somewhat further than usual from the brake pedal so as to permit the foot-rest hereinafter described to be positioned therebetween, and also the accelerator lever 10 is extended further upwardly than usual so that the upper surface of pedal 9 will be positioned susbtantially in the same plane as the corresponding surface of brake pedal 6, or alternatively somewhat above this brake pedal as indicated in Fig. 2. With the exceptions just noted, this lever and pedal combination is substantially the same as now commonly used, and it will be understood that the exact form, size and inclination of these pedals may vary in different types or designs of motor-cars.

The invention also comprises a pair of similar and normally stationary foot-rests A and B, the foot-rest A being positioned between the accelerator pedal 9 and the brake pedal 6, and the foot-rest B being positioned at the left of clutch pedal 8. These foot-rests A and B are so designed and positioned that the upper surfaces 12 of the foot-supporting portions thereof will be in substantially the same inclined plane as the corresponding upper surfaces of pedals 9, 6 and 8 when these pedals are in their normal or uppermost positions. It is essential that these foot-rests be positioned at least as high as the brake and clutch pedals, and preferably at the same inclination or in the same plane, although a slight variation in the inclination of the pedals and foot-rests is unimportant as long as no portion of the brake and clutch pedals extend to a greater height than the foot-rests. The accelerator pedal 9 may project somewhat higher than rest A.

The simplest or unitary form of foot-rest shown in Figs. 1 and 2 comprises a base plate 13, fixedly secured to the foot-board 2 by screws 13' or equivalent means, an upper tread or foot-supporting portion 14 preferably provided with an upwardly extending heel-rest 15 at its rear or lower end, and a web structure or stilt 16 connecting the base and foot-support so that this tread portion or foot-support will be properly positioned at the same height and inclination as the pedals. The web portion 16 may be centrally cut away as shown in Fig. 2 so as to comprise a plurality of leg members.

Preferably, instead of using a supporting web 16 of fixed height, the foot-rest will be provided with adjustable supporting means connecting the base and foot-support 14. One suitable form of adjusting means is shown in Figs. 4 and 5. Instead of a single web 16, a pair of overlapping webs or sets of leg members are used, one pair of legs 17 extending downwardly from the foot-support 14 while a second pair of legs 18 extend upwardly from the base 13. One pair of these legs is vertically slotted, as indicated at 19 in the legs 18, and the other pair of legs are provided with mating openings as indicated at 20. Clamping means, for example ordinary carriage bolts 21 are used to adjustably secure the legs 17 and 18 together. As here used, the square stem portion 22 of the bolt is slidable in slot 19, while the threaded portion 23 of the bolt extends loosely through opening 20, and the bolt is clamped in place by nut 24. It will be apparent that, after the bolts are loosened, the foot-support may be adjusted vertically by moving the bolts along the slots 19, and sufficient play will also be provided in the openings to permit a limited tilting movement of foot-support 14 so as to bring this support into proper inclination to correspond with the inclination of the pedals.

Another form of adjusting means is shown in Figs. 6 and 7. As here shown, the lower end portions of base 13 and foot-support 14 are pivotally connected as indicated at 25. At the other end of base 13 is an internally threaded boss 26 in which is engaged the screw 27 having a rounded head 28 at its upper end which engages the lower surface of foot-support 14. A clamping plate or cap 29 (see Fig. 7) has a semi-globular cavity 30 enclosing the head 28 of the screw, and an opening 31 through which the shank of the screw extends downwardly. Clamping plate 29 is adjustably secured to the lower surface of foot-support 14 by a screw 32 extending through a slot 33 in plate 29. When clamping screw 32 is loosened, the screw-bolt 27 may be rotated in any suitable manner, for example by inserting a tool in an opening 34 formed in the screw. When the foot-support 14 has been positioned at the proper inclination, clamping screw 32 is tightened so as to clamp the holding plate 29 against the head of screw 27 thus locking the parts in the adjusted position. It will be apparent that adjusting screws might be used to support each end of foot-support 14, and also a great variety of other adjusting means might be used in the foot-rest.

The brake pedal 6 is preferably provided at its left-hand side (that is the side adjacent the clutch pedal 8) with an upstanding stop-flange 35 adapted to be engaged by the left-hand side of the right foot to limit the movement of this foot toward the left so as to keep the right foot on the brake pedal and prevent its being moved over too far, or onto the clutch pedal. Similarly, clutch pedal 8 is provided at its right-hand side with an upstanding stop-flange 36. The stop flanges 35 and 36 may be made integral with the pedals (see Fig. 3), or may be in the form of separate flanges attached to the pedals in any suitable manner. For example, as shown in Fig. 3ᵃ the stop member 35' is in the form of an angle plate having a vertically extending flange 37 fitting against the side of the pedal and a laterally extending flange 38 fitting beneath the lower surface of the pedal. Either or both of these flanges can be attached to the pedal by screws 39, or in any other suitable manner.

While driving, the driver will rest his feet comfortably on the supporting surfaces 12 of the foot-rests A and B, the feet being properly positioned by letting the heels bear against the lower upstanding flanges 15. The accelerator 9 can be easily operated by simply twisting the toe portion of the right foot toward the right and pressing down on the accelerator pedal, or the driver may prefer to tilt the edge portion of the right foot downwardly in order to operate the accelerator. When the brake is to be applied, the driver simply slips the right foot over to the left onto the brake pedal 6 and then pushes downwardly. Ordinarily the entire foot will be moved off from rest A onto pedal 6 since the brake pedal will have to be pushed down a considerable distance unless the brakes happen to be very accurately adjusted with practically no lost motion. However, as soon as the brake is released and pedal 6 is permitted to move upwardly, the foot can be slipped directly back onto rest A.

The left foot will remain for the greater part of the time on foot-rest B, since ordinarily the clutch is operated much less frequently than the brake. When it becomes necessary to throw out the clutch, the driver simply slips his left foot laterally toward the right onto pedal 8 and then pushes downwardly in the usual manner.

In an emergency, when the car must be stopped as instantaneously as possible, both feet are simply moved toward one another from the rests onto the respective brake and clutch pedals and then simultaneously pushed downwardly. The upright stop flanges 35 and 36 on the pedals will prevent the feet from being moved too far toward one another and will keep the feet respectively on the proper pedals.

This new and improved arrangement of the foot-operated driving mechanism greatly simplifies the driving process, especially for beginners, and an experienced driver will soon adapt himself to the new routine. The feet rest comfortably for the greater portion of the time on the foot-rests A and B, and much less movement of the feet and legs is required since the feet will ordinarily be at the proper level and inclination for operating each one of the pedals.

While the upper surface of accelerator pedal 9 may be positioned at the same height as foot-rest A, it is in some ways preferable to position this pedal somewhat higher as suggested in Fig. 2. The toe of the right foot can be elevated somewhat to engage the accelerator, and the ordinary range of movement of the accelerator will then not extend so far below the foot-rest.

It is more essential that no portion of the brake or clutch pedals extends above the foot-rests, thus eliminating any chance of catching the feet on the sides of these pedals when the feet are quickly shifted thereto in an emergency. There is no material objection to having the brake and clutch pedals slightly below the foot-rests, or having them at a slightly different inclination so long as no portion of the pedals projects above the foot-rests.

In any event the pedals may all be accurately described as located in "substantially" the same plane as the foot-rests. To obtain the best results they should all be positioned approximately in this plane when in their uppermost or released positions.

I claim:

1. In combination with the brake and accelerator pedals of an automobile, and the levers supporting said pedals and extending downward through openings in the foot-board of the automobile, both of the pedals being positioned at substantially the same inclination and height above the foot-board and adapted to be bodily depressed while remaining in the same inclination, a stationary foot-rest mounted on the foot-board between the pedals, the upper foot-supporting surface of the rest being closely adjacent and at least as high as the upper foot-engaging surface of the brake pedal when in its uppermost position.

2. In combination with the brake and accelerator pedals of an automobile, and the levers supporting said pedals and extending downwards through openings in the foot-board of the automobile, both of the pedals being positioned at substantially the same inclination and height above the foot-board and adapted to be bodily depressed while remaining in parallel planes, a stationary foot-rest mounted on the foot-board between the pedals, the upper foot-supporting surface of the rest being closely adjacent and at least as high as the upper foot-engaging surface of the brake pedal when in its uppermost position, the brake-pedal being provided with an upwardly extending stop-flange at the side furthest removed from the foot-rest.

3. In combination with the brake and accelerator pedals of an automobile, and the levers supporting said pedals and extending downward and adapted to be depressed through openings in the foot-board of the automobile, both of the pedals being positioned at substantially the same inclination and height above the foot-board, a stationary foot-rest mounted on the foot-board between the pedals, the upper foot-supporting surface of the rest being closely adjacent and at least as high as the upper foot-engaging surface of the brake-pedal when in its uppermost position, the foot-rest comprising the upper foot-supporting portion, a base fixedly mounted on the foot-board, and adjustable means connecting the foot-support and base whereby the elevation and inclination of the foot-support can be varied.

4. In combination with the brake and accelerator pedals of an automobile, and the levers supporting said pedals and extending downward and adapted to be depressed through openings in the foot-board of the automobile, both of the pedals being positioned at substantially the same inclination and height above the foot-board, a stationary foot-rest mounted on the foot-board between the pedals, the upper foot-supporting surface of the rest being closely adjacent and at least as high as the upper foot-engaging surface of the brake pedal when in its uppermost position, the brake pedal being provided with an upwardly extending stop-flange at the side furthest removed from the foot-rest, the foot-rest comprising the upper foot-supporting portion, a base fixedly mounted on the foot-board, and adjustable means connecting the foot-support and base whereby the elevation and inclination of the foot-support can be varied.

5. The combination with a foot-actuated control pedal of an automobile, and the lever which supports the pedal at its upper end and extends downwardly and is adapted to be depressed through an opening in the foot-board of the automobile, of a foot-rest positioned adjacent the pedal and comprising an upper foot-supporting portion, a base fixedly mounted on the foot-board, and adjustable means connecting the foot-support with the base so that the upper surface of the foot support can be positioned in substantially the same plane as the upper foot-engaging surface of the pedal.

6. In combination with the brake and clutch pedals of an automobile, and the levers supporting said pedals and extending downwardly and adapted to be depressed through openings in the foot-board of the automobile, the pedals being positioned adjacent one another and at substantially the same inclination and height above the foot-board, a stationary foot-rest mounted on the foot-board and positioned closely adjacent the outer side of the brake pedal and at least as high as the upper foot-engaging surface of the brake pedal when in its uppermost positions.

7. In combination with the brake and clutch pedals of an automobile, and the levers supporting said pedals and extending downwardly and adapted to be depressed through openings in the foot-board of the automobile, the pedals being positioned adjacent one another and at substantially the same inclination and height above the foot-board, a stationary foot-rest mounted on the foot-board and positioned closely adjacent the outer side of the brake pedal and at least as high as the upper foot-engaging surface of the brake pedal when in its uppermost position, the pedals being provided with upwardly extending stop-flanges at their adjacent sides.

8. In combination with the brake and clutch pedals of an automobile, and the levers supporting said pedals and extending downwardly and adapted to be depressed through openings in the foot-board of the automobile, the pedals being positioned adjacent one another and at substantially the same inclination and height above the foot-board, a stationary foot-rest mounted on the foot-board and positioned closely adjacent the outer side of the brake pedal and at least as high as the upper foot-engaging surface of the brake pedal when in its uppermost positions, said foot-rest comprising an upper foot-supporting portion, a base fixedly mounted on the foot-board, and adjustable means connecting the foot-support and base whereby the elevation and inclination of the foot-support can be varied.

9. In combination with the brake and clutch pedals of an automobile, and the levers supporting said pedals and extending downwardly and adapted to be depressed through openings in the foot-board of the automobile, the pedals being positioned adjacent one another and at substantially the same inclination and height above the foot-board, a stationary foot-rest mounted on the foot-board and positioned closely adjacent the outer side of the brake pedal and at least as high as the upper foot-engaging surface of the brake pedal when in its uppermost position, the pedals being provided with upwardly extending stop-flanges at their adjacent sides, said foot-rest comprising an upper foot-supporting portion, a base fixedly mounted on the foot-board, and adjustable means connecting the foot-support and base whereby the elevation and inclination of the foot-support can be varied.

10. In combination with the brake, clutch and accelerator pedals of an automobile, and the levers supporting these pedals and extending downwardly and adapted to be depressed through openings in the foot-board of the automobile, the pedals all being positioned at substantially the same inclination and height above the foot-board, a stationary foot-rest mounted on the foot-board and positioned in substantially the same plane as the upper foot-engaging surfaces of the pedals when in their uppermost positions, said foot-rest being located between the accelerator and brake pedals.

11. In combination with the brake, clutch and accelerator pedals of an automobile, and the levers supporting these pedals and extending downwardly and adapted to be depressed through openings in the foot-board of the automobile, the pedals all being positioned at substantially the same inclination and height above the foot-board, a stationary foot-rest mounted on the foot-board and positioned in substantially the same plane as the upper foot-engaging surfaces of the pedals when in their uppermost positions, said foot-rest being located between the accelerator and brake pedals, the clutch and brake pedals being provided with upwardly extending stop-flanges adjacent one another.

12. In combination with the brake, clutch and accelerator pedals of an automobile, and the levers supporting these pedals and extending downwardly and adapted to be depressed through openings in the foot-board of the automobile, the pedals all being positioned at substantially the same inclination and height above the foot-board, a stationary foot-rest mounted on the foot-board and positioned in substantially the same plane as the upper foot-engaging surfaces of the pedals when in their uppermost positions, said foot-rest being located between the accelerator and brake pedals, said foot-rest comprising an upper foot-supporting portion, a base fixedly mounted on the foot-board, and adjustable means connecting the foot-support and base whereby the inclination and height of the foot-support can be varied.

13. In combination with the brake, clutch and accelerator pedals of an automobile, and the levers supporting these pedals and extending downwardly and adapted to be depressed through openings in the foot-bard of the automobile, the pedals all being positioned at substantially the same inclination and height above the foot-board, a stationary foot-rest mounted on the foot-board and positioned in substantially the same plane as the upper foot-engaging surfaces of the pedals when in their uppermost positions, said foot-rest being located between the accelerator and brake pedals, the clutch and brake pedals being provided with upwardly extending stop-flanges adjacent one another, said foot-rest comprising an upper foot-supporting portion, a base fixedly mounted on the foot-board, and adjustable means connecting the foot-support and base whereby the inclination and height of the foot-support can be varied.

14. A foot-rest adapted to be mounted on the foot-board of an automobile adjacent a control pedal, said foot-rest comprising an upper foot-supporting portion, a base adapted to be fixedly mounted on the foot-board, and adjustable means connecting the foot-support and base whereby the rest can be adjusted to bring the upper surfaces of the foot-support and pedal in substantially the same plane, said means comprising an internally threaded boss on one of the relatively adjustable members, a screw threaded at one end in the boss and provided with a rounded head at the other end engaging the other member, and a clamping cap partially enclosing the rounded head and adjustably secured to the last-mentioned member of the foot-rest.

VALERIUS POMERNACKI.